July 27, 1943.  D. H. MONTGOMERY  2,325,571
FORMING SLIDE STOP
Filed May 13, 1939  2 Sheets-Sheet 1
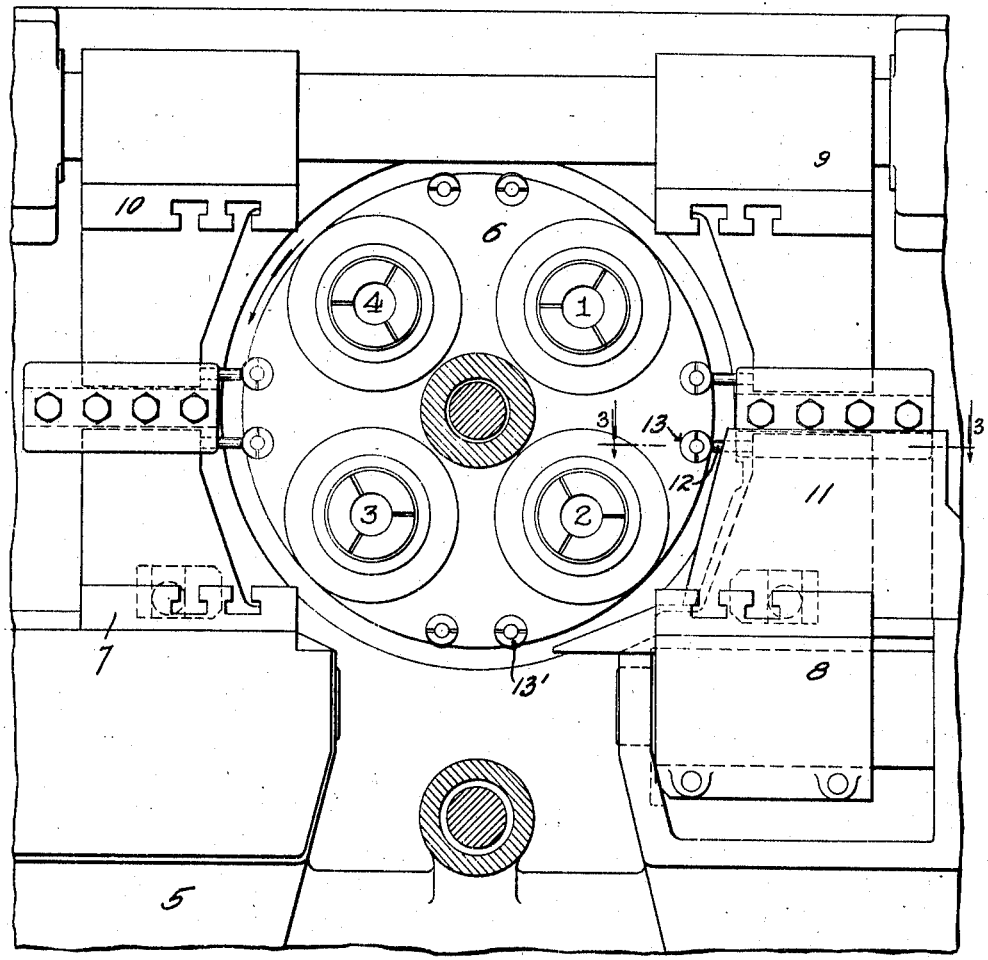
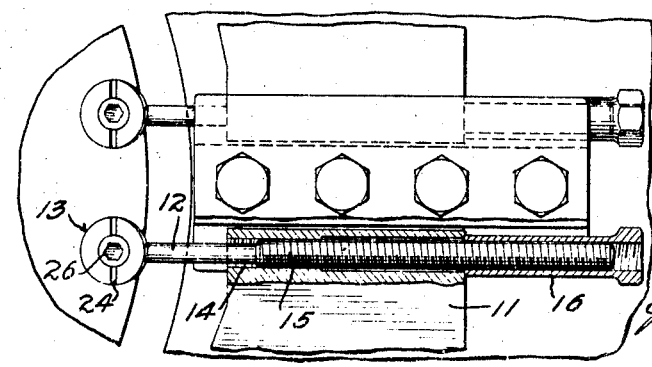
INVENTOR
DONALD H. MONTGOMERY
BY
ATTORNEYS

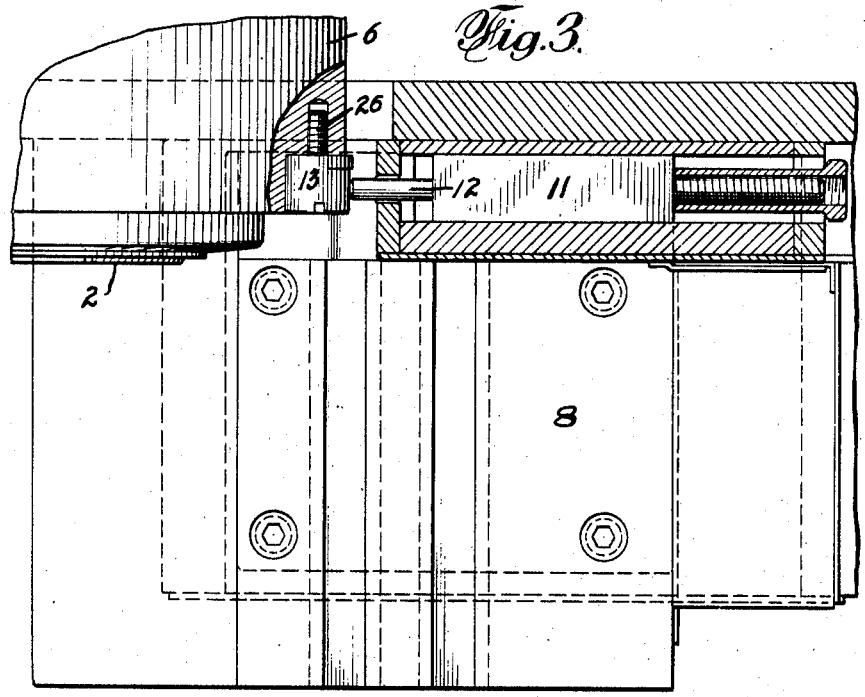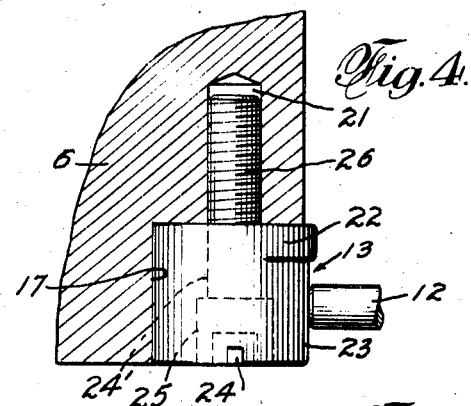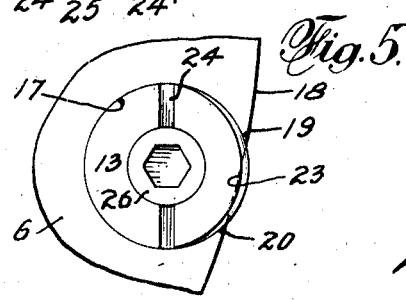

Patented July 27, 1943

2,325,571

UNITED STATES PATENT OFFICE 2,325,571

FORMING SLIDE STOP

Donald H. Montgomery, West Hartford, Conn., assignor to The New Britain Machine Company, New Britain, Conn., a corporation of Connecticut Application May 13, 1939, Serial No. 273,463

7 Claims. (Cl. 29—37)

My invention relates to a forming slide stop.

It is now common practice to provide forming slide stops to limit the feed movement of the slide and the stops for individual spindles are adjustable to compensate for slight inaccuracies of the positions of the spindles. In a multiple spindle machine forming slide stops have often included blocks or other devices secured to the front face of the spindle carrier, those blocks being provided with radially adjustable screws to be engaged by a coacting stop member carried by the tool slide. The stops carried by the spindle carrier are usually adjusted once and for all to take care of slight inaccuracies in the positioning of the various spindles in the spindle carrier, and the coacting stop members on the tool slides are adjustable so as to permit various adjustments to be made, depending upon the character of the operations to be performed on the piece parts.

The forming slide stops heretofore employed with which I am familiar have been open to the objection that chips sometimes collect and may extend over the stop, so that when the coacting stop part carried by the tool slide comes up it engages the chips rather than the stop member carried by the spindle carrier and over-sized piece parts are produced.

Furthermore, stops carried by the front face of the spindle carrier and projecting substantially therefrom tend in some cases to obscure the vision of the operator and tend to congest the sometimes limited space at the face of the spindle carrier between the latter and various tools and tool slides.

It is an object of my invention to provide an improved forming slide stop which will overcome the difficulties above mentioned and others and which is simple in construction and adjustment, sturdy and not likely to get out of order.

More specifically it is an object of the invention to provide an improved form of stop for a slide upon which it will be difficult or impossible for chips to lodge.

It is another object to provide an improved form of stop which has substantially no projecting parts to either collect chips or congest the space in the vicinity of the face of the spindle carrier.

It is another object to provide an improved form of stop which may be very accurately adjusted between relatively wide limits.

Other objects and various features of novelty and improvement will be hereinafter pointed out or will become apparent to those skilled in the art.

In the drawings which show, for illustrative purposes only, a preferred form of the invention—

Fig. 1 is a fragmentary view of a multiple spindle machine looking toward the face of the spindle carrier;

Fig. 2 is an enlarged fragmentary front view in partial section of parts shown in Fig. 1;

Fig. 3 is an enlarged sectional view taken substantially in the plane of the line 3—3 of Fig. 1;

Fig. 4 is an enlarged fragmentary sectional view of the stop parts as shown in Fig. 3; and Fig. 5 is a fragmentary view in front elevation of parts shown in Fig. 4.

The invention will be described as embodied in a multiple spindle machine of the type set forth in Gridley et al. Patent No. 2,055,435, dated September 22, 1936.

Generally speaking such a machine includes a frame 5, which carries an indexible generally cylindrical spindle carrier 6. A plurality of rotatable spindles, designated 1, 2, 3 and 4, are carried by the spindle carrier, all as will be understood. The designating characters 1, 2, 3 and 4, while referring to spindles in general, refer also in Fig. 1 to the spindle positions, that is to say, the No. 1 position is at the lower left, No. 2 at the lower right, etc., and each spindle will be successively indexed into each of the four positions indicated.

In the form shown there are four forming slides 7—8—9—10. These slides correspond to the four spindle positions and it is to be understood that any one or more of the slides may be employed as occasion requires. The forming slides are actuated by suitable cams or other devices, not here shown but illustrated and described more specifically in said Gridley et al. patent.

In the form shown each slide, for example, on the transversely extending guide plate 11 thereon, carries an adjustable stop member 12 for successive engagement with coacting stop members 13 on the spindle carrier. Since the pairs of stop members 12 and 13 may be and preferably are duplicates of each other, a specific description of one pair may suffice for all. In the form shown the slide part 11 has a threaded bore 14, into which is threaded the body 15 of the stop member 12, and it will be clear that the longitudinal position of the stop member 12 relatively to the slide may be varied by simply turning the stop member 12 back and forth. A lock nut 16 serves to hold the stop member 12 in definite position of adjustment. My invention relates particularly to the stop member 13 carried by the spindle carrier rather than to the coacting stop member 12, which may be of any suitable type.

In the form illustrated the spindle carrier is provided with a cylindrical bore 17 extending longitudinally inwardly from the face of the spindle carrier and so positioned as to intersect the outer cylindrical or peripheral surface 18 of the spindle carrier, that is to say, the cylindrical bore 17 is not wholly within the spindle carrier but there is an opening in the periphery defined by the corners or edges 19—20 where the bore 17 intersects the periphery of the spindle carrier. The bore 17 may be referred to as a counterbore, since in the preferred form there is a threaded bore 21 concentric with the bore 17, for a purpose to be described.

The stop member 13 in the preferred form is a generally cylindrical member, having a generally cylindrical surface 22, which quite accurately fits the inner cylindrical surface of the bore 17. However, at least a part of the side surface of the stop member 13 exposed to the outside of the spindle carrier between the points 19—20 is not truly cylindrical but is eccentric, as indicated at 23. The eccentric surface in the particular form shown extends through substantially 180° of the surface. The stop member 13 may be provided with means, such as a driver slot 24, which may be engaged by a suitable tool, generally of the screw driver type, for accurately adjusting the angular position of the stop member 13 in the bore 17. The stop member 13 is provided with a concentric bore 24' and a counterbore 25, so that a securing screw 26 may be passed through the bore 24 and the head housed in the counterbore 25. The screw 26 takes into the threaded bore 21 and when the screw is turned up the head is preferably completely housed within the stop member and there are no projecting parts. It will be seen that generally speaking the screw member 26 has only to hold the stop member 13 securely in place and the stresses incident to the stopping function of the member 13 are taken by the member and its solid abutment in the bore 17 in the spindle carrier.

It is to be understood that the front face of the stop member 13 is preferably substantially flush with the front face of the spindle carrier and the exposed portion of the eccentric surface 23 is substantially flush with and might be said to substantially form a continuation of the outer peripheral surface of the spindle carrier. Therefore, it will be practically impossible for chips to collect on the surface 23, which is the surface against which the coacting stop member 12 engages.

When there are symmetrically arranged forming slides, for example, the pair of slides 7—9 and the pair 8—10, the same stop 13 may be employed for both of the forming slides of a symmetrical pair, that is to say, a single stop for the slide 7 will be equally effective for the symmetrically placed slide 9. Where there are two sets of symmetrically placed slides, as in the present disclosure, each spindle will preferably be provided with a stop for each set of symmetrical slides. Therefore, the stop designated 13 in Fig. 1 will take care of the symmetrical slides 8—10 and the spindle in the second position (typical of any spindle) will have in addition to its stop 13 another stop, designated 13', which will be equally effective as a stop for the symmetrically placed slides 7—9.

When the machine is ready for use it will be seen that the adjustments of the stops 13—13' for each of the spindles may be readily effected. The screw 26 is simply backed off a sufficient distance to permit rotative adjustment of the stop member 13 with the coacting stop in some definitely adjusted position. When the correct adjustment of the stop 13 for one spindle has been made relatively to one coacting stop 12, the screw 26 is tightened up and the machine indexed to bring the corresponding stop 13 of the next spindle into position to be engaged by the same coacting stop 12. The stop 13 of the latter spindle is then adjusted in the same manner and so on for the others. The stops 13' would be adjusted in the same manner and all of the spindles would therefore have the stops so set that, in effect, any small differences in what may be termed the radii of the spindles, that is, the distance from the axis of the spindle carrier, would be compensated for and identical piece parts would thus be produced.

With forming slide stops of the character disclosed, wherein a special type of driver or wrench is required for adjustment, it is unlikely that operators would ever tamper with the adjustments of the stops, which adjustments, of course, when once properly made are permanent.

While the invention has been described in considerable detail and a preferred form illustrated, it is to be understood that various changes may be made within the scope of the invention as defined in the appended claims.

I claim:

1. In a device of the character indicated, a generally cylindrical spindle carrier, and a forming slide stop member carried thereby, said spindle carrier having a longitudinally extending generally cylindrical recess therein intersecting the cylindrical surface of said carrier, said stop member being of generally cylindrical form and fitting within said recess, a portion of the outer generally cylindrical surface of said stop member being eccentrically formed and exposed at the cylindrical surface of said spindle carrier for engagement by another stop member.

2. A spindle carrier including a generally cylindrical indexible member, a plurality of spindles carried thereby, said spindle carrier at the periphery having a generally cylindrical recess extending longitudinally therein and opening at one cylindrical side on the periphery of said cylindrical spindle carrier, and a forming slide stop including a generally cylindrical member fitting within said generally cylindrical recess in said spindle carrier recess and being substantially housed therein, one side of said generally cylindrical stop member being exposed at the outer periphery of said spindle carrier, said exposed surface being positioned so as to form substantially a continuation of and being substantially flush with the outer cylindrical surface of said spindle carrier, said exposed surface of said generally cylindrical stop member being in part eccentric to the remainder thereof.

3. A spindle carrier including a generally cylindrical member, said member having a cylindrical generally longitudinally extending bore therein, a part of said bore intersecting the peripheral surface of said spindle carrier, and a forming slide stop including a generally cylindrical member seated and housed in said generally cylindrical bore in said spindle carrier and having a part of its surface exposed at the peripheral side of said spindle carrier, said exposed surface being formed eccentrically relatively to another portion of said stop member.

4. A spindle carrier including a generally cylindrical indexible member, said spindle carrier having a generally cylindrical longitudinally extending bore therein intersecting the peripheral surface of said spindle carrier, a forming stop member of generally cylindrical form fitting within said bore, and screw means extending longitudinally through said forming stop member for securing the latter to said spindle carrier, said forming slide stop member having a surface eccentrically formed relatively to another portion thereof, said eccentrically formed surface being exposed at the outer periphery of said spindle carrier, for the purpose described.

5. In a device of the character indicated, a generally cylindrical spindle carrier, said spindle carrier having a generally arcuate form of recess opening outwardly on its generally cylindrical outer surface, a forming slide stop having a generally arcuate outer surface to fit the corresponding surface in said recess and leave a part exposed at the outer surface of said spindle carrier, the exposed surface of said forming slide stop being eccentrically formed relatively to the generally arcuate portion thereof, said exposed portion at the outer surface of said spindle carrier being substantailly flush therewith and forming substantially a continuation of the outer cylindrical surface of said spindle carrier.

6. In a device of the character indicated, a generally cylindrical spindle carrier, a forming slide stop member secured thereto and exposed at the surface of said spindle carrier, and a securing member passing through said forming slide stop member for securing the latter to said spindle carrier, at least one of said members having a generally eccentrically formed surface for positioning a part of the outer exposed surface of said forming stop at different radial distances from said spindle carrier upon relative rotation between said members.

7. In a device of the character indicated, a generally cylindrical indexible spindle carrier, a plurality of spindles carried by said spindle carrier, said spindle carrier having a plurality of recesses corresponding to a plurality of said spindles, said recesses opening outwardly on the generally cylindrical outer surface of said spindle carrier, a forming slide stop in each of said recesses and having a part exposed through the recesses, each said stop being supported by inner well means defining at least a part of said recess, and each stop having an outer surface eccentric to another outer surface thereof, whereby rotative movement about an axis parallel to the axis of said spindle carrier of each said stop on its recess support will cause an exposed surface thereof to project different radial distances, and independent means for each stop for holding the latter in positions of rotative adjustment.

DONALD H. MONTGOMERY.